(12) United States Patent
Inbar

(10) Patent No.: US 9,436,002 B2
(45) Date of Patent: Sep. 6, 2016

(54) MULTICHANNEL OPTICAL POWER METER USING A SYNCHRONOUS SCANNER

(71) Applicant: CALIENT Technologies, Inc., Goleta, CA (US)

(72) Inventor: Michael Inbar, Santa Barbara, CA (US)

(73) Assignee: CALIENT Technologies, Inc., Goleta, CA (US)

( * ) Notice: Subject to any disclaimer, the term of this patent is extended or adjusted under 35 U.S.C. 154(b) by 224 days.

(21) Appl. No.: 14/038,431

(22) Filed: Sep. 26, 2013

(65) Prior Publication Data

US 2015/0055202 A1  Feb. 26, 2015

Related U.S. Application Data

(60) Provisional application No. 61/869,535, filed on Aug. 23, 2013.

(51) Int. Cl.
   *G02B 26/10* (2006.01)

(52) U.S. Cl.
   CPC .................... *G02B 26/105* (2013.01)

(58) Field of Classification Search
   CPC .......................... G02B 6/105; H04N 13/0275
   USPC ............ 359/199.1, 21.1, 212.2, 197.1, 201.1
   See application file for complete search history.

(56) References Cited

U.S. PATENT DOCUMENTS

| | | | |
|---|---|---|---|
| 4,241,257 A * | 12/1980 | Koester | A61B 3/15 250/235 |
| 5,121,138 A | 6/1992 | Schermer et al. | |
| 6,331,909 B1 | 12/2001 | Dunfield | |
| 6,870,560 B2 * | 3/2005 | Bush | B41J 2/47 347/243 |
| 2009/0279156 A1* | 11/2009 | Yen | G02B 26/105 359/199.4 |
| 2010/0079865 A1* | 4/2010 | Saarikko | G02B 6/0016 359/566 |
| 2010/0142018 A1* | 6/2010 | Shin | G02B 26/086 359/199.3 |

* cited by examiner

*Primary Examiner* — Stephone B Allen
*Assistant Examiner* — Rahman Abdur
(74) *Attorney, Agent, or Firm* — SoCal IP Law Group LLP; John E. Gunther; Steven C. Sereboff

(57) ABSTRACT

Optical scanning systems and methods of controlling a resonant scanning mirror are disclosed. A rotatable mirror may oscillate about a rotation axis in response to a drive signal. A reference source may provide a reference light beam directed to the rotatable mirror. A reference detector may be disposed to receive the reference light beam reflected from the rotatable mirror twice during each oscillation of the rotatable mirror. A controller may set both an amplitude and a frequency of the drive signal based on an output of the reference detector.

16 Claims, 9 Drawing Sheets

MULTICHANNEL OPTICAL POWER METER USING A SYNCHRONOUS SCANNER

RELATED APPLICATION INFORMATION

This patent claims priority to Provisional Patent Application No. 61/869,535, filed Aug. 23, 2013, entitled Multi-Channel, Synchronous, Optical Scanner.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
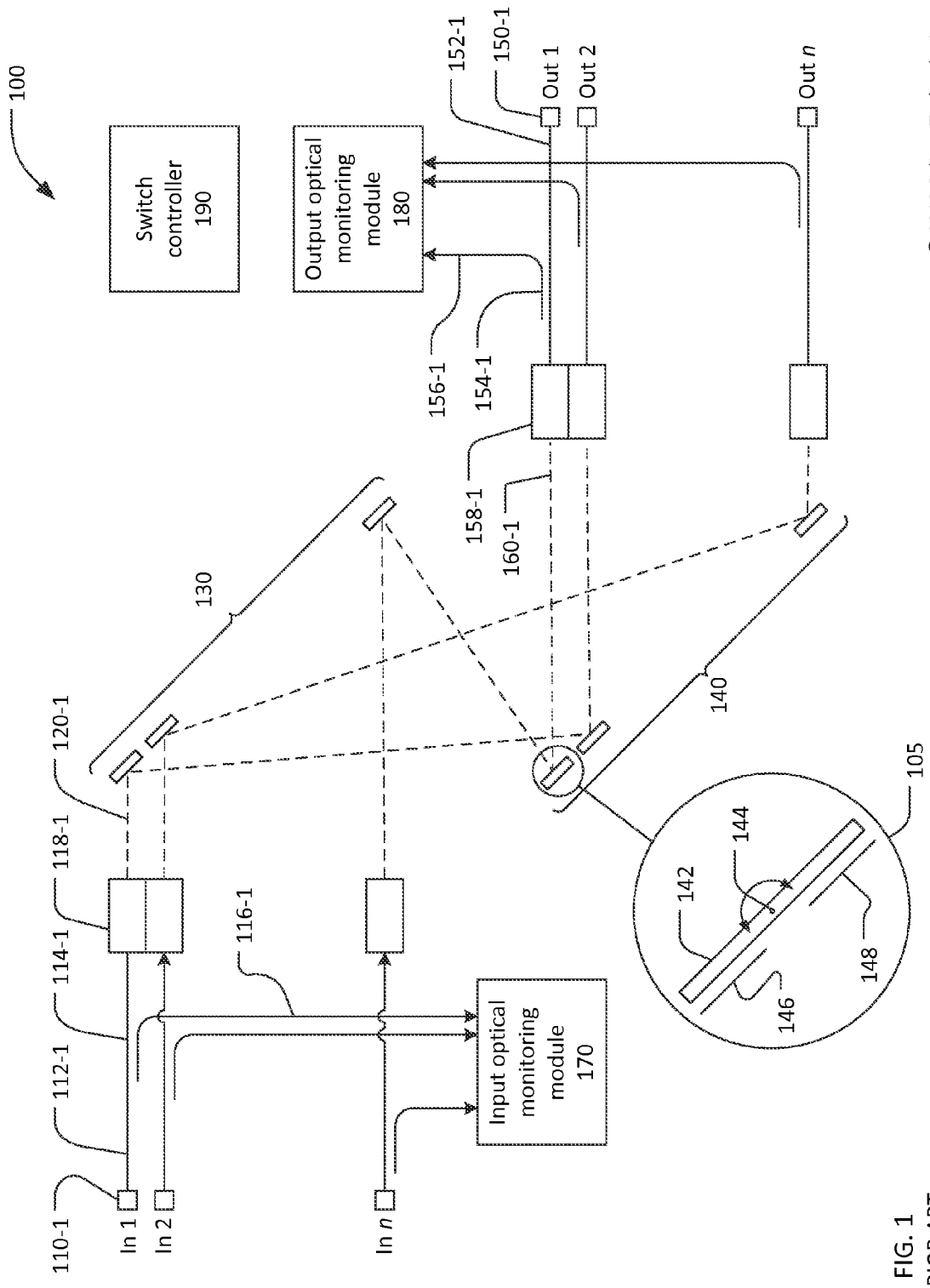
FIG. 1 is an optical schematic diagram of an optical circuit switch.

Referring now to FIG. 1, an exemplary optical circuit switch 100 may be configured to connect a group of n input ports (where n is an integer greater than 1), labeled In 1 to In n, to a group of n output ports, labeled Out 1 to Out n. More specifically, the optical circuit switch 100 may selectively connect up to n pairs of ports, where each pair of ports includes an input port and an output port.

Each of the input ports In 1 to In n may include a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective tap coupler (of which only tap coupler 114-1 is identified). Each tap coupler may extract an input sample portion, for example 1% to 10%, of the input optical signal from the respective optical fiber. Each input sample portion may be directed via a respective optical fiber (of which only optical fiber 116-1 is identified) to an input optical monitoring module 170. The remainder of each input optical signal, other than the respective input sample portion, may be conveyed by a respective optical fiber to a respective collimator lenses (of which only collimator lens 118-1 is identified). Each collimator lens may convert the input optical signal from the respective optical fiber into a collimated input optical beam (of which only input optical beam 120-1 is identified) in free space. Free space optical beams are shown in FIG. 1 as dashed lines.

Each input optical beam, such as input optical beam 120-1, may be directed onto a first mirror array 130. The first mirror array 130 may include n mirrors with a one-to-one correspondence between input optical beams and mirrors, such that each input optical beam is directed onto a respective mirror. To improve the manufacturing yield of the first mirror array, the first mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches Each mirror on the first mirror array 130 may reflect the respective input optical beam to a selected mirror of a second mirror array 140. The mirrors of the second mirror array 140 may reflect the incident beam to form a respective output optical beam (of which only output optical beam 160-1 is identified). Each output optical beam may be directed to a corresponding focusing lens (of which only focusing lens 158-1 is identified). Each focusing lens may focus the respective output optical beam into an output optical signal in a respective optical fiber. Each output optical signal may be conveyed to a respective output tap coupler (of which only output tap coupler 154-1 is identified). Each output tap coupler may direct a sample portion (for example 1% to 10%) of the respective output optical signal via a respective optical fiber (of which only optical fiber 156-1 is identified) to an output optical monitoring module 180. The remainder of each output optical signal, other than the respective sample portion, may be conveyed to a respective output port connector (of which only connector 150-1 is identified).

The optical circuit switch 100 may create a one-to-one connection between each input port and any one of the output port. For example, as shown in FIG. 1, Port In 1 is connected to port Out 2, port In 2 is connected to port Out n, and port In n is connected to port Out 1.

The detail view 105 shows a simplified schematic diagram of a mirror from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148.

For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode may be "dedicated" to the mirror element 142, which is to say the only function of the electrodes 146 and 148 is to rotate the mirror element 142 and the voltages applied to the electrodes 146 and 148 have no effect on any mirror element other than the mirror element 142.

In the simplified example of FIG. 1, the mirror element 142 rotates about a single axis defined by the torsion bars 144. Either or both of the first mirror array 130 and the second mirror array 140 may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 105. For example, U.S. Pat. No. 6,628,041 describes a MEMS mirror array having two-axis mirror motion and comb actuators.

The input optical monitoring module 170 and the output optical monitoring module 180 may be a common module. The input optical monitoring module 170 and the output optical monitoring module 180 may measure the optical power in each of the input sample portions and output sample portions, respectively. Each of the input optical monitoring module 170 and the output optical monitoring module 180 may include an optical power detector for each sample portion. Alternatively, each of the input optical monitoring module 170 and the output optical monitoring module 180 may time-multiplex a single detector or an array of detectors such that each detector measures the optical power of sequence of sample portions. For example, each of the input optical monitoring module 170 and the output optical monitoring module 180 may use a scanning mirror to direct sample portions to a single detector or an array of detectors as described in U.S. Pat. No. 7,676,125.

Sample portions may be extracted from the input optical beams, such as input optical beam 120-1, and/or the output optical beams, such as output optical beam 160-1, using one or more free space sampling optical elements. For example, sample portions may be extracted as described in U.S. Pat. Nos. 6,597,825 or 6,668,108. Input tap couplers, such as input tap coupler 114-1 and/or output tap couplers, such as output tap coupler 154-1, may not be present when free-space sampling optical elements are used to extract sample portions.

The input optical monitoring module 170 and the output optical monitoring module 180 may provide power measurement data to a switch controller 190. The switch controller 190 may control the rotation angles of some or all of the mirror elements in the first mirror array 130 and the second mirror array 140 based on the power measurement data. For example, the switch controller 190 may determine an insertion loss of each connection through the optical circuit switch and may control the mirror elements to minimize the insertion loss of each connection.

Figure 2:
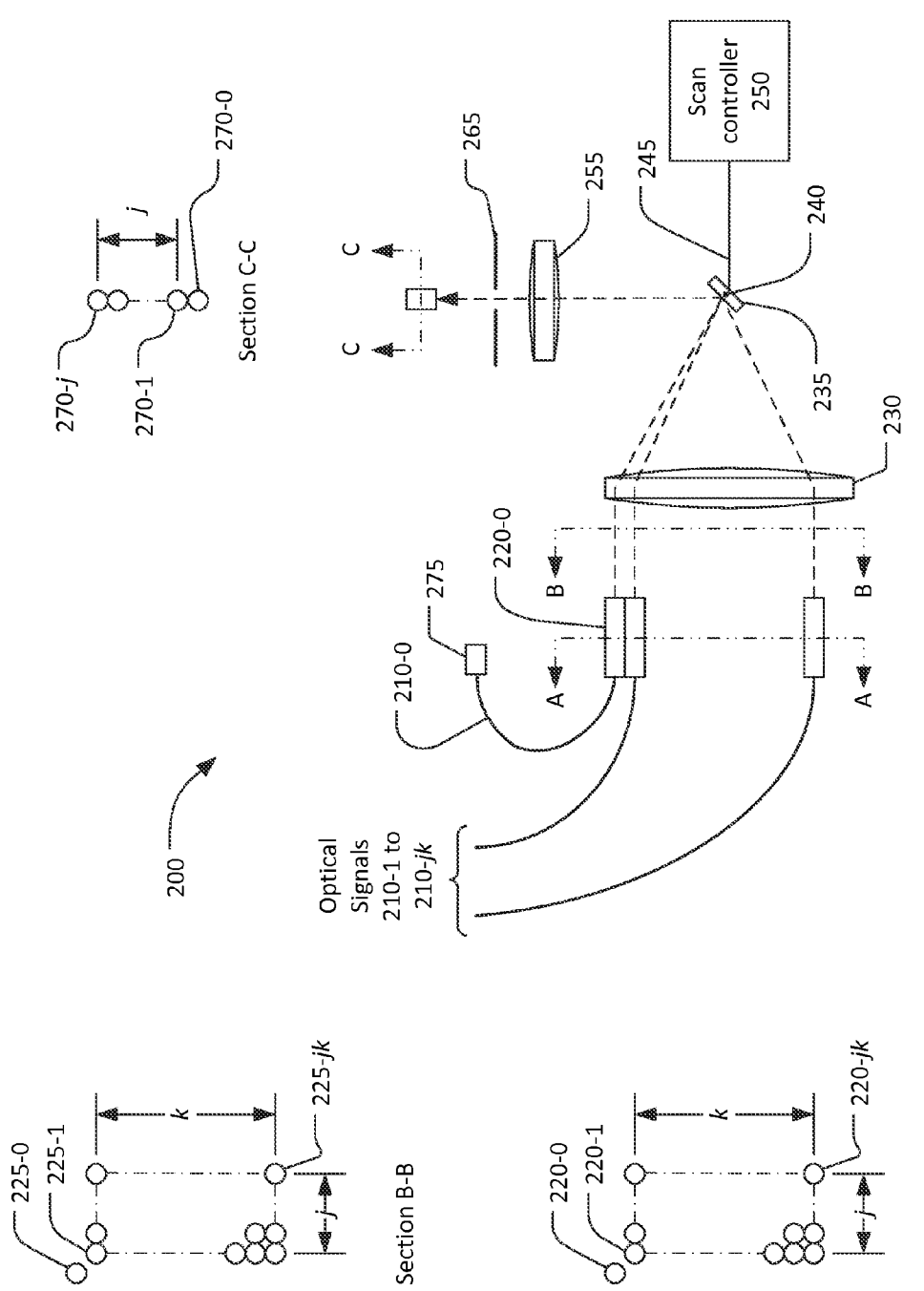
FIG. 2 is a schematic optical diagram of a multi-channel optical power meter.

Referring now to FIG. 2, a multichannel optical power meter 200 may be suitable for use as the input optical monitoring module 170 and/or the output optical monitoring module 180 of the optical circuit switch 100. The multichannel optical power meter 200 may include a scanning mirror 235 to time-multiplex a limited number of signal detectors 270-1 to 270-*j* (identified in the cross-sectional view C-C) to measure the optical power of a larger number of optical signals 210-1 to 210-*jk*, where j and k are positive integers. The optical signals 210-1 to 210-*jk* may be the input sample portions and/or the output sample portions from the tap couplers (e.g. 114-1, 154-1) in the optical circuit switch 100. The function of the scanning mirror and the associated optical system may be as described U.S. Pat. No. 7,676,125, which is incorporated herein by reference.

Each of the optical signals 210-1 to 210-*jk* may be conveyed through a respective optical fiber to a respective collimating lens 220-1 to 220-*jk* (shown in cross-sectional view A-A). The collimating lenses may be arranged, for example, in a rectangular matrix having j rows of k lenses. Each of the collimating lenses 220-1 to 220-*jk* may convert the respective optical signals into respective collimated signal beams 225-1 to 225-*jk* (shown in cross-sectional view B-B).

The multichannel optical power meter 200 may include a reference light source 275, which may be, for example, a laser diode or a light emitting diode. The reference light source 275 may be coupled to a reference collimating lens 220-0 via an optical fiber 210-0. The reference collimating lens 220-0 may convert the light from the reference light source 275 into a collimated reference beam 225-0.

A first lens 230 may focus the collimated signal beams 225-1 to 225-jk and the collimated reference beam 225-0 onto the scanning mirror 235. The scanning mirror 235 may be located at the focal point of the first lens 230. The collimating lenses 220-0 to 220-jk may be configured such that a beam waist of each collimated beam is positioned at the scanning mirror 235. Light reflected from the scanning mirror may be re-collimated by a second lens 255. The second lens 255 may be disposed such that its focal point lies at the scanning mirror. The first lens 230 and the second lens 250 may have the same focal length and may function as a 1:1 relay system. An aperture plate 265 may include apertures aligned with each of the detectors 270-0 to 270-j. The diameter of each aperture may be about the same as the diameter of one of the collimated signal beams 225-0 to 225-jk.

The scanning mirror 235 may be configured to oscillate about a rotation axis 240 normal to the plane of FIG. 2 in response to a drive signal 245. The rotational movement of the scanning mirror may be oscillatory, rather than continuous rotation in a single direction. The drive signal 245 may be provided by a scan controller 240, which will be described in detail subsequently. As the scanning mirror rotates, each row of the collimated signal beams 225-1 to 225-jk may be scanned across a corresponding one of the signal detectors 270-1 to 270-j. Further, as the scanning mirror rotates, the collimated reference beam 225-0 may be scanned across a reference detector 270-0 twice during each oscillation of the scanning mirror.

Figure 3:
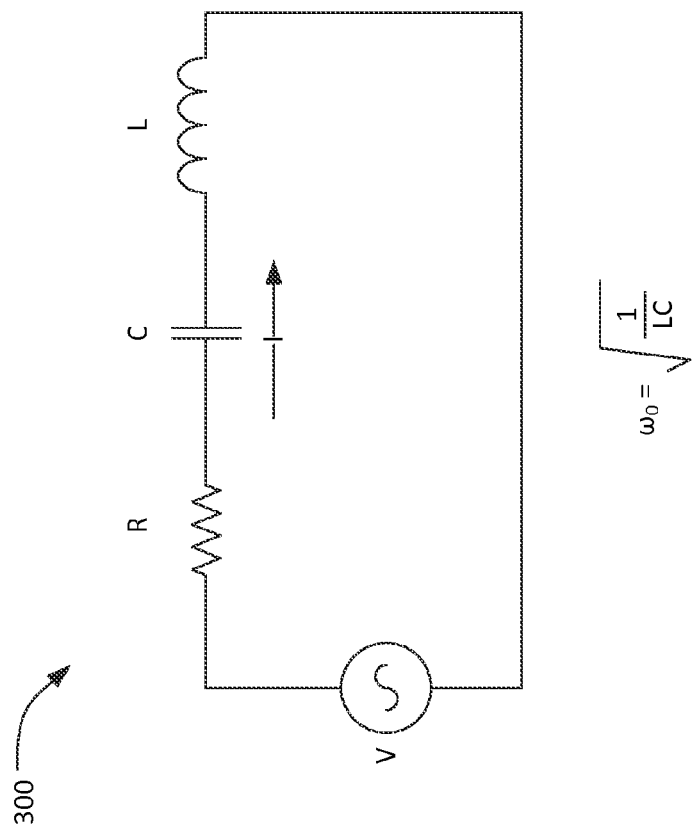
FIG. 3 is an electrical equivalent circuit of a resonant scanning mirror.

The scanning mirror 235 may be a MEMS (microelectromechanical system) device including a mirrored substrate suspended on torsion bars and driven to rotate about an axis of the torsion bars using electrostatic attraction. Such a device may have a pronounced resonance at a particular resonant frequency. An electrical circuit 300 analogous to a resonant scanning mirror is shown in FIG. 3. In the circuit 300, the capacitor C stores energy in a manner analogous to storing mechanical potential energy as strain in the torsion bars and the inductor L stores energy in a manner analogous to the rotational momentum of the scanning mirror substrate. The circuit 300 will resonate at a resonance frequency $\omega_0$. The resistor R represents energy losses, which may occur in a mechanical system due to friction, for example. The relative amount of the energy loss will determine the sharpness or Q of the circuit.

Figure 4:
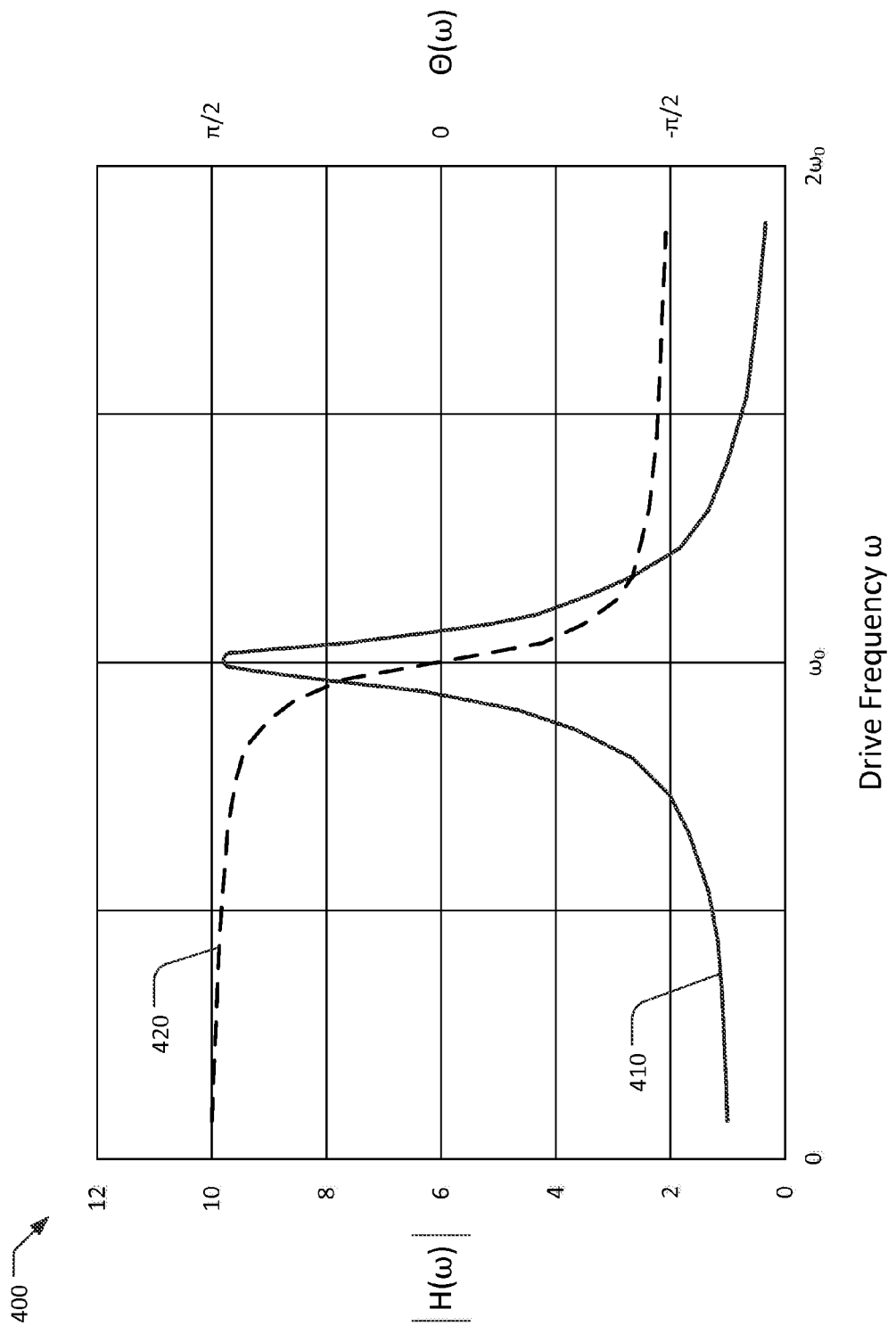
FIG. 4 is a graph illustrating the performance of a resonant scanning mirror as a function of frequency.

The losses in a MEMS scanning mirror may be very small, resulting in a pronounced resonance as shown in FIG. 4. FIG. 4 is a graph 400 showing the performance of a resonant scanning mirror as a function of drive frequency, which is to say the frequency of a drive signal or signals applied to electrodes to cause the scanning mirror to rotate. The solid curve 410 plots the magnitude of the mirror movement $|H(\omega)|$, in arbitrary units. The dashed curve 420 plots the phase angle $\Theta(\omega)$ between the mirror rotation and the drive signal. Note that the phase angle $\Theta(\omega)$ is zero at the resonant frequency $\omega_0$.

Figure 5:
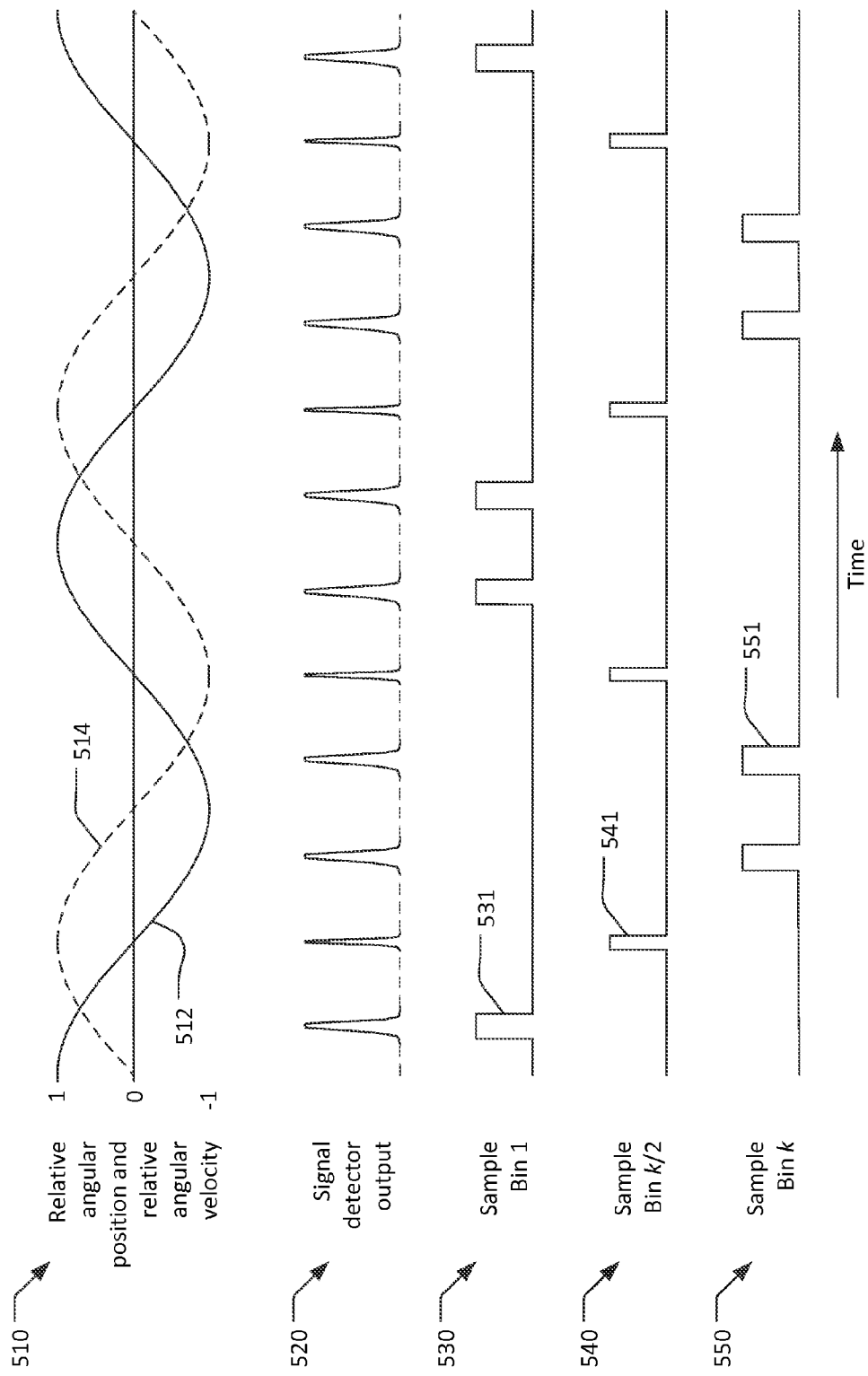
FIG. 5 shows graphs illustrating the performance of a multi-channel optical power meter.

FIG. 5 shows a series of graphs 510-550 illustrating the operation of a multichannel optical power meter such as the multichannel optical power meter 200. All of the graphs 510-550 share a common time scale. Graph 510 shows the relative angular position (solid curve 512) and relative angular velocity (dashed curve 514) of a scanning mirror. Both the angular position and angular velocity of the scanning mirror may vary sinusoidally, with a 90-degree phase difference between the angular position and angular velocity. The actual range of angular motion of the scanning mirror may be, for example, as large ±30 degrees, but may be smaller such as ±10 degrees or ±15 degrees.

Graph 520 shows the output of a representative signal detector, which may be for example one of the signal detectors 270-1 to 270-j in the multichannel optical power meter 200. Assuming the each of the signal beams 225-1 to 225-jk has a Gaussian profile, the output of the signal detector may be a series of Gaussian pulses of varying width as each of the signal beams is scanned onto the detector by the action of the scanning mirror.

The time axis may be divided into a sequence of sample bins, as shown in graphs 530, 540, and 550. Consistent with the example of FIG. 2, the time axis may be divided into k sample bins in which k corresponding optical beams may be directed sequentially onto the detector by the scanning mirror. Note that each signal beam is directed onto the detector twice during each oscillation of the scanning mirror (once while the mirror is rotating in a clockwise direction and a second time as the mirror rotates back in a counter-clockwise direction. Thus each sample bin has two portions during each oscillation of the scanning mirror.

Each sample bin may correspond to a respective range of angular positions of the scanning mirror, and the angular width of all of the sample bins may be identical. However, since the angular velocity of the scanning mirror varies sinusoidally during each oscillation of the scanning mirror, the temporal width of the scanning bins may vary. Specifically, sample bins near the center of the scanning mirror movement range, such as sample bin 541 may be narrow in time due to the high angular velocity of the scanning mirror. Sample bins near the extremes of the scanning mirror movement range, such as sample bins 531 and 551 may be wider in time due to the relatively low angular velocity of the scanning mirror near the extremes of its movement range.

Figure 6:
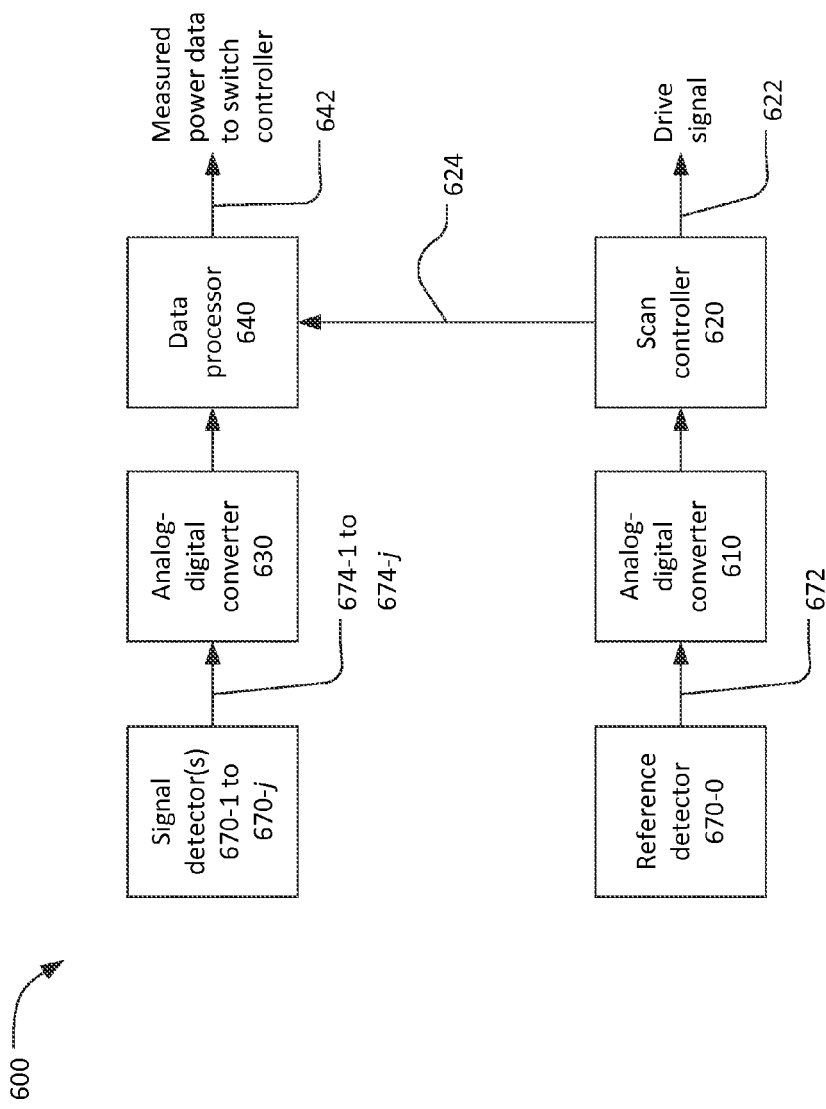
FIG. 6 is a block diagram of a multi-channel optical power meter.

Referring now to FIG. 6, a multichannel optical power meter 600, which may be the multichannel optical power meter 200, may include a reference detector 670-0, one or more signal detectors 670-1 to 670-j, respective analog to digital converters 610, 630, a scan controller 620 and a data processor 640. The multichannel optical power meter 600 may also include a scanning mirror, a reference beam source, and various optical components not shown in FIG. 6.

A reference signal 672 output from the reference detector 670-0 may be converted into digital form by the analog-digital converter 610. The digitized reference signal may be provided to the scan controller 620. The scan controller 620 may determine both the amplitude and frequency of a drive signal 622 based upon the reference signal 672. The drive signal may drive the scanning mirror are previously described. The scan controller 620 may also provide mirror position data 624, which is to say data indicating an instantaneous position of the scan mirror, to the data processor 640.

One or more signals 674-1 to 674-j output from respective signal detectors 670-1 to 670-j may be digitized by the analog to digital converter 630. The digitized signals may be input to the data processor 640. The data processor 640 may use the mirror position data 624 to define a series of sequential sample bins, such as the sample bins 531, 541, 551. The data processor 640 may then determine power data indicative of a respective power level for each digitized signal within each sample bin. For example, the data processor 640 may determine a peak level of each digitized signal within each sample bin. The data processor 640 may integrate each digitized signal over each sample bin. The data processor 640 may low-pass filter each digitized signal (for example by computing a rolling average over a predetermined number of samples) and then determine a peak level of each filtered signal within each sample bin. The data processor 640 may determine power data for each digitized signal within each sample bin in some other manner.

The data processor 640 may transmit power data 642 to a switch controller, such as the switch controller 190. For example, the data processor 640 may send power data 642 to the switch controller as the data is determined, at the conclusion of every oscillation of the scanning mirror, upon request from the switch controller, or at some other time. The power data 642 may be sent from the data processor 640 to the switch controller over a bus, a network, or other communications path.

Figure 7:
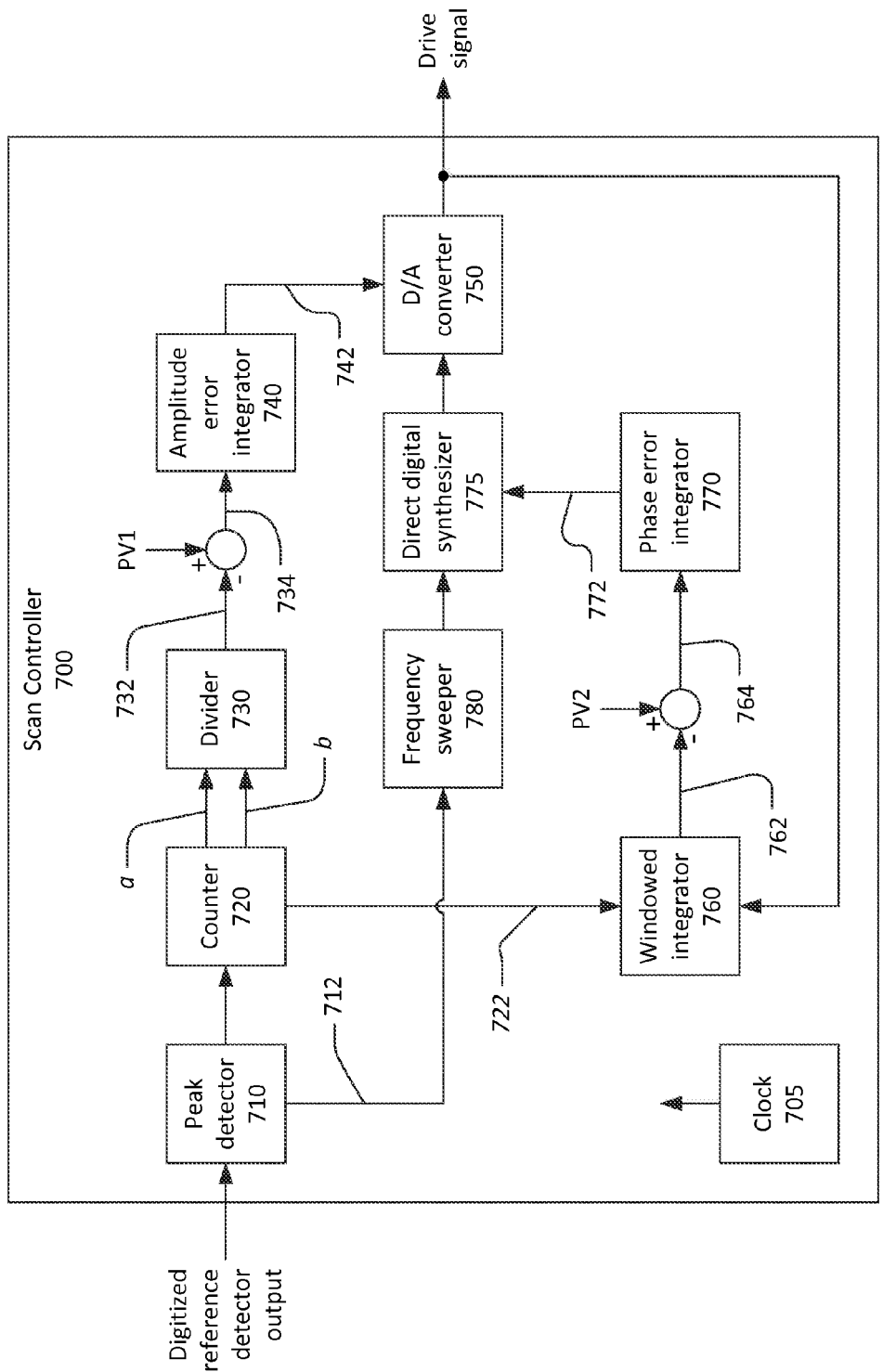
FIG. 7 is a block diagram of a scan controller for a multi-channel optical power meter using a synchronous scanner.

FIG. 7 is a block diagram of a scan controller 700 which may be suitable for use as the scan controller 620 in the multichannel optical power meter 600. The operation of the scan controller 600 may be understood with reference to the timing diagram provided in FIG. 8.

Figure 8:
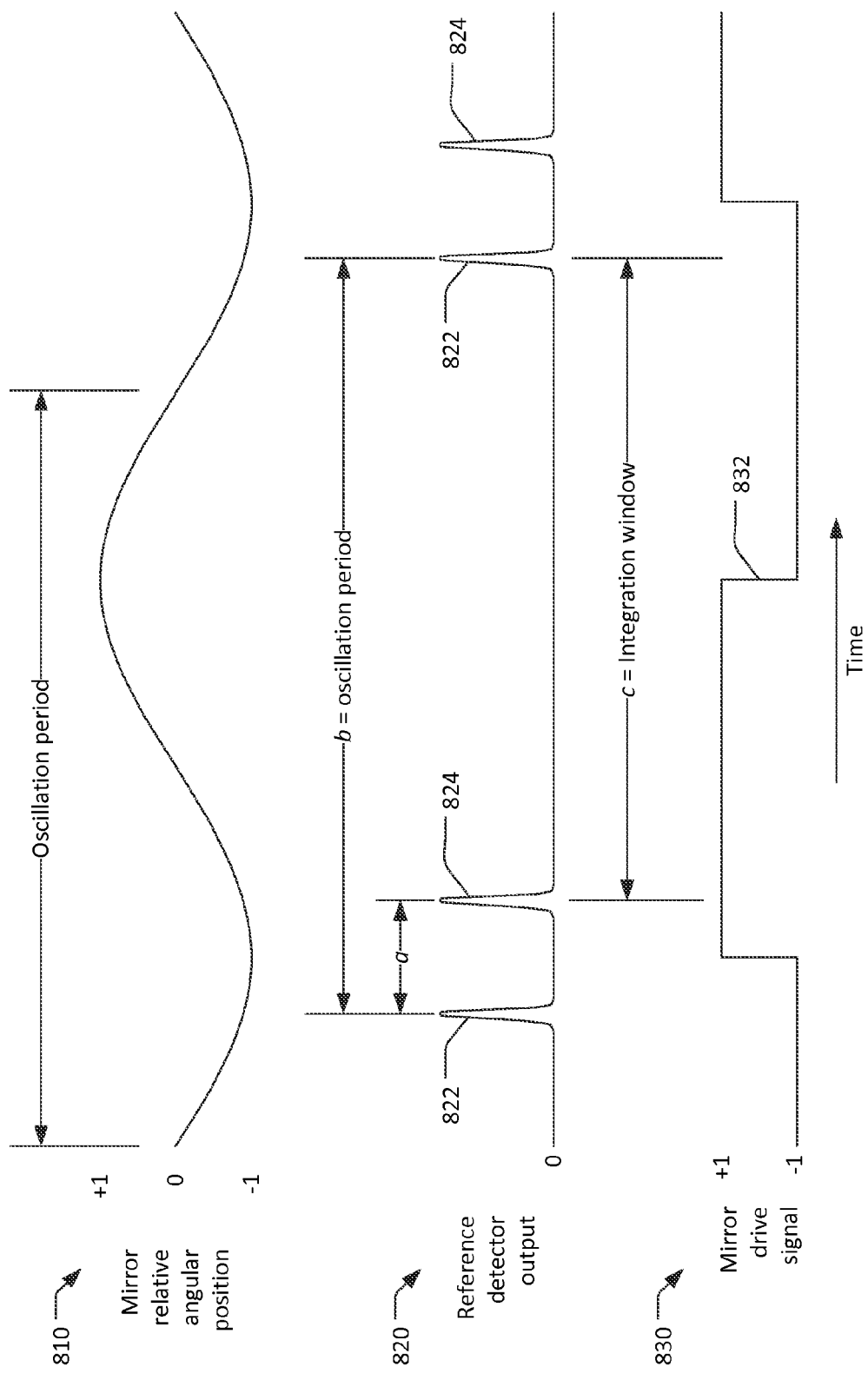
FIG. 8 is a timing diagram illustrating the performance of the scan controller.

In FIG. 8, the diagram 810 shows the relative angular position of a scanning mirror, such as the scanning mirror 235, which oscillates with a sinusoidal motion having an oscillation period. The diagram 820 shows the output of a reference detector, such as the reference detector 270-0. The reference detector may receive light from a reference light source reflected from the scanning mirror. The reference detector and the reference light source may be disposed such that the reference detector receives light from the reference light source twice during each oscillation period. Thus the reference light source may output a signal having two pulses 822, 824 during each oscillation period. The pulses 822, 824 may have a generally Gaussian shape. The reference detector and the reference light source may be disposed such that the reference detector receives light from the reference light source when the scanning mirror is near an extreme of its angular motion range. Thus a time interval a between the two pulses 822, 824 may be small (i.e. less than half) of the oscillation period b.

Referring back to FIG. 7, the scan controller 700 may include a clock source 705 that provides a clock signal to various elements of the scan controller 700. The clock signal may have a period substantially smaller than the oscillation period b of the scanning mirror. For example, the scanning mirror may oscillate at a frequency on the order of 1 kilohertz (oscillation period about 1 millisecond) and the clock frequency may be 10 megahertz, 100 megahertz, or higher (clock period less than 0.1 microsecond).

The digitized output of the reference detector may be input to a peak detector 710. The peak detector 710 may process the digitized reference detector output to determine the temporal positions of the centers of two pulses (i.e. pulses 822, 824 in FIG. 8). The peak detector may, for example, low-pass filter the digitized reference detector output to suppress noise and then extrapolate the centers of the two pulses. The peak detector may compare the digitized reference detector output to a predetermined threshold to transform each pulse into a rectangular pulse. The peak detector may then define the temporal location of each peak as the midpoint between the leading and trailing edges of the corresponding rectangular pulse. The peak detector may determine the temporal positions of the centers of the two pulses to an accuracy of one clock period.

A counter 720 may determine the time interval a between the centers of the two pulses and the oscillation period b based on an output from the peak detector 710. The counter 720 may, for example, determine the time interval a between the centers of the two pulses and the oscillation period b to an accuracy of one clock period.

The time interval a occurs during an extreme portion of each oscillation of the scanning mirror, assuming that the amplitude of the oscillation of the scanning mirror is sufficient to cause the reference beam to be reflected to the reference detector. The oscillation period b is independent of the amplitude of the oscillation of the scanning mirror. It can be understood that a ratio of the time interval a to the oscillation period b is indicative of the amplitude of the oscillation of the scanning mirror.

A divider 730 may determine a value 732 for the ratio a/b. The value 732 may be subtracted from a first predetermined value (PV1) to provide an amplitude error value 734. An amplitude error integrator 740 may integrate the amplitude error value 734. An integrated amplitude error 742 may be input to a multiplying D/A converter. The integrated amplitude error 742 may set the amplitude of the drive signal output from the D/A converter 750.

As previous discussed, the phase shift between a drive signal provided to a movement of a resonant scanning mirror and the mirror movement will be zero when the mirror is driven at its resonant frequency. Referring back to FIG. 8, the diagram 830 shows the mirror drive signal. It can be understood that, when the scanning mirror is driven at its resonant frequency, a transition 832 of the mirror drive signal will be precisely centered between the pulses 824 and 822. Further, it can be understood that an integral of the mirror drive signal over an integration window c is indicative of a phase difference between the drive signal and the mirror motion. Specifically, the integral of the drive signal over the window c will be zero if the drive signal and the mirror motion are in phase, which will occur when the mirror is driven at its resonant frequency.

Referring again to FIG. 7, the counter 720 may provide a signal 722 indicative of the integration window c. A windowed integrator 760 may repeatedly integrate the drive signal (from the D/A converter 750) over the integration window. At the end of each integration window, an integration result 762 may be subtracted from a second predetermined value (PV2) to provide a phase error value 764. The second predetermined value PV2 may be zero if the scanning mirror is to be driven at its resonant frequency.

A phase error integrator 770 may integrate the phase error value 764. An integrated phase error 772 may be input to a direct digital synthesizer 775 that determines the frequency of the drive signal. An output of the direct digital synthesizer 775 may be multiplied by the integrated amplitude error in the D/A converter 750 to generate the drive signal.

As previously described in conjunction with FIG. 4, the amplitude $H(\omega)$ of the angular motion of a scanning mirror may be small unless the scanning mirror is driven at a frequency close to its resonant frequency. When a multichannel optical power meter is initialized, or placed into service, the frequency output from the direct digital synthesizer 775 may be set to a nominal resonant frequency (i.e. a resonant frequency for a nominal or average scanning mirror). However, the resonant frequency of a particular scanning mirror may vary from the nominal resonant frequency. In some cases, the resonant frequency of a particular scanning mirror may vary from the nominal to a sufficient extent that the motion of the scanning mirror, upon initialization, is very small. In this case, the reference beam may never be reflected to the reference detector such that the peak detector 710 does not detect any peaks in the digitized reference detector output.

When the digitized reference detector output does not contain peaks, the peak detector 710 may output a signal 712 to enable a frequency sweeper 780 to control the direct digital synthesizer 775. The frequency sweeper 780 may cause the direct digital synthesizer 775 to sweep the frequency of the drive signal over a predetermined frequency range that encompasses the entire range of possible resonant frequencies for the scanning mirror. During the frequency sweep, the amplitude of the drive signal may be set to a maximum value by the action of the amplitude error integrator 740.

The frequency sweeper 780 may control the direct digital synthesizer 775 until the frequency of the drive signal approaches the resonant frequency of the particular scanning mirror. Once the frequency of the drive signal is close to the resonant frequency of the particular scanning mirror, the peak detector 710 may detect peaks in the digitized reference detector output. The frequency sweeper 780 may then be disabled (via the signal 712) and the drive signal may be generated by the scan controller 700 as previously described.

The functional elements of the scan controller 700 may be implemented by a collection of hardware, which may be augmented by firmware and/or software. The collection of hardware may include analog circuits, digital circuits, and one or more processors such as micro controllers, microprocessors, and/or digital signal processors. All or portions of the functional elements of the scan controller 700 may be implemented by a processor executing stored software instructions. All or portions of the functional elements of the scan controller 700 may be implemented in one or more application specific integrated circuits (ASICs) and/or one or more programmable circuit devices such as programmable logic arrays and field programmable gate arrays (FPGAs).

Configuration data for programming a programmable circuit device may be stored in a memory or a machine readable storage medium and used to configure a programmable circuit device upon power-up of a test system. In this patent, the term "machine readable storage medium" means a physical medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

The depiction of the scan controller 700 as a plurality of functional elements does not imply a corresponding physical division of the hardware constituting the scan controller. Any functional element may be divided between two or more modules, circuit cards, programmable circuit devices, ASICs, or other circuit devices. All or portions of two or more functional element may be collocated within a common programmable circuit device, ASIC, or other circuit device.

Description of Processes

Figure 9:
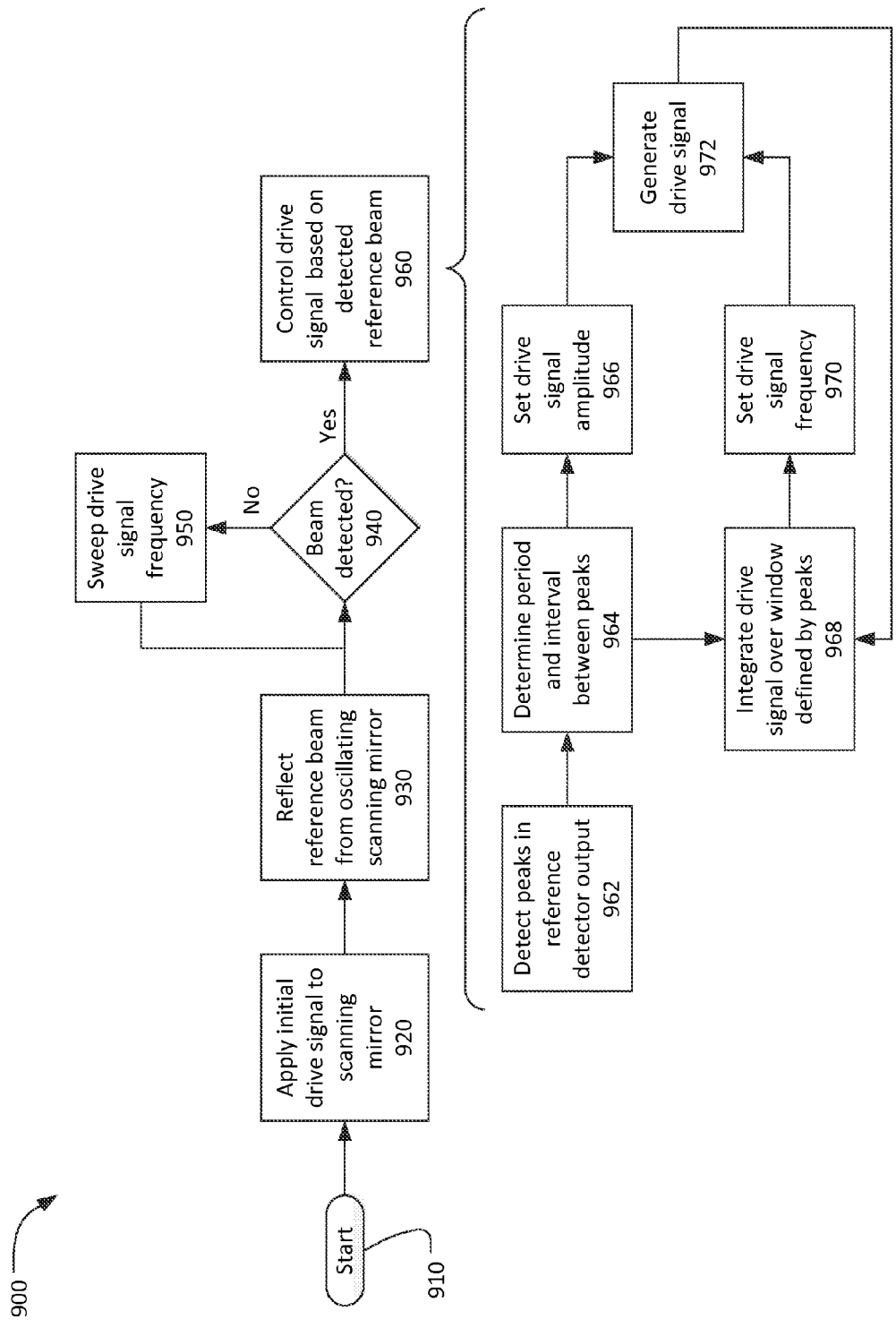
FIG. 9 is a flow chart of a process for controlling a resonant scanning mirror.

FIG. 9 is a flow chart of a process 900 to control a resonant scanning mirror, such as the scanning mirror 235, within a multichannel power meter, such as the multichannel optical power meter 200. Although the process 900 is shown as a series of actions for ease of explanation, all of the actions of the process 900 may be performed concurrently and in real time. The process 900 may start at 910 when the multichannel optical power meter is first put into service and may proceed continuously thereafter.

At 920, an initial drive signal may be applied to a scanning mirror. The scanning mirror may be, for example, a MEMS mirror and the drive signal may be applied to one or more electrodes associated with the MEMS mirror. The drive signal may include a first component to cause the MEMS mirror to rotate in a first direction (e.g. clockwise or counterclockwise) and a second component to cause the MEMS mirror to rotate in the opposite direction. The first and second components, when present, may be applied to respective electrodes coupled to the MEMS mirror. The application of the drive signal at 920 may cause the scanning mirror to oscillate, or cyclically rotate about a predetermined axis.

At 930, a reference beam of light may be reflected from the oscillating scanning mirror. The reference beam may be provided by a reference light source, such as the reference source 220-0.

At 940, a determination may be made whether or not the reference beam reflected from the oscillating scanning mirror is detected by a reference detector, such as the reference detector 270-0. As previously described, when the resonant scanning mirror is operating normally, the reference detector receives the reference beam from the scanning mirror twice during each oscillation of the scanning mirror. However, when the drive signal applied at 920 has a frequency different from the resonant frequency of the scanning mirror, the amplitude of the rotational movement of the scanning mirror may be insufficient to cause the reference beam to be reflected to the reference detector. In this case ("no" at 940), the frequency of the drive signal may be swept (i.e. varied continuously or in steps) at 950 over a frequency range expected to include the resonant frequency of the scanning mirror.

As the frequency of the drive signal approaches the resonant frequency of the scanning mirror, the amplitude of the rotation of the scanning mirror will increase such that the reference beam is detected by the reference detector ("yes" at 940). Once the reference beam is detected, the drive signal may be controlled at 960 based on the detected reference beam. Specifically, both the frequency and the amplitude of the drive signal may be controlled at 960 based on the output of the reference detector. The actions taken at 960 to control the drive signal are shown in greater detail at 962-972.

At 962, the output signal from the reference detector may be processed to detect the temporal location of signal peaks in the output signal from the reference detector. As previously described, the reference beam may be reflected from the scanning mirror to the reference detector twice, resulting in two signal peaks during each oscillation of the scanning mirror. The processing at 962 may include, for example, low pass filtering or other noise suppression processing and analysis of the peak shapes to determine the location, in time, of the center of each peak. For example, the reference detector output may be compared to a predetermined threshold to transform each signal peak into a rectangular pulse. The temporal location of each peak may be defined as the midpoint between the leading and trailing edges of the corresponding rectangular pulse. The temporal location of each peak may be determined to an accuracy of one clock period.

At 964, an output from the peak detector may be processed to determine a period of the scanning mirror oscillation and a time interval between the two peaks that occur during each oscillation period. As previously described, the reference beam source and the reference detector may be disposed such that the reference beam is reflected to the reference detector when the scanning mirror is near an extreme of its rotary motion. In this case, the time interval between the two peaks may be less than half of the oscillation period.

At 966, the amplitude of the drive signal may be set based on the oscillation period and the time interval determined at 964. For example, the ratio of the time interval to the oscillation period may be determined and compared to a first predetermined value. A difference between the ratio of the time interval to the oscillation period and the first predetermined value may be integrated to provide an analog value (or a digital value that may be converted to an analog value). Note that this analog value is stable (i.e. does not change) when the ratio of the time interval to the oscillation period is equal to the first predetermined value. This analog value may be used to set the amplitude of the drive signal generated at 972.

At 968, the drive signal may be repeatedly integrated over a recurring time window defined by the peaks detected at 962. This time window may be the oscillation period exclusive of the interval between the two peaks determined at 964.

The result of the windowed integration (i.e. the value of the integral at the end of each window) performed at 968 may be used to set the drive frequency at 970. For example, the value of the integral at the end of each window may be compared to a second predetermined value. A difference between the value of the integral at the end of each window and the second predetermined value may be integrated to provide a digital value. Note that this digital value is stable (i.e. does not change) when the value of the integral at the end of each window is equal to the second predetermined value. This digital value may be input to a direct digital synthesizer to set the frequency of the drive signal generated at 972.

The drive signal may be generated at 972 by multiplying a square wave output from the direct digital synthesizer at 970 by the analog value from 966.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An optical scanning system, comprising:
   a scanning mirror that oscillates about a rotation axis in response to a drive signal;
   a reference source to provide a reference light beam directed to the scanning mirror;
   a reference detector disposed to receive the reference light beam reflected from the scanning mirror twice during each oscillation of the scanning mirror, the reference detector outputting two pulses during each oscillation of the scanning mirror, a time interval between the two pulses less than one-half of an oscillation period of the scanning mirror; and
   a controller that sets both an amplitude and a frequency of the drive signal based on an output of the reference detector, wherein the controller further comprises:
   a windowed integrator to compute an integral of the drive signal over the oscillation period exclusive of the time interval between the peaks of the two pulses;
   a second subtractor to determine a difference between a second predetermined value and an output of the windowed integrator at an end of each integration period;
   a second integrator to integrate the output of the second subtractor,
   a direct digital synthesizer configured to output a square wave, wherein a frequency of the square wave is set by an output of the second integrator.

2. The optical scanning system of claim 1, wherein the controller is configured to set the amplitude of the drive signal such that a ratio of the time interval between the two pulses and the oscillation period is equal to a first predetermined value.

3. The optical scanning system of claim 1, wherein the controller is configured
   to compute an integral of the drive signal over the oscillation period exclusive of the time interval between the two pulses, and
   to set the frequency of the drive signal such that the integral is equal to a second predetermined value.

4. The optical scanning system of claim 1, wherein the controller comprises:
   a counter configured to determine the time interval between the peaks of the two pulses and to determine the oscillation period;
   a divider to determine the ratio of the time interval between the two pulses and the oscillation period;
   a first subtractor to determine a difference between a first predetermined value and the ratio of the time interval between the two pulses and the oscillation period; and
   a first integrator to integrate the output of the first subtractor,
   wherein an output of the first integrator sets the amplitude of the drive signal.

5. The optical scanning system of claim 4, wherein the controller further comprises:
   a multiplying digital to analog converter to multiply the square wave output from the direct digital synthesizer by the output of the first integrator to provide the drive signal.

6. The optical scanning system of claim 1, further comprising:
at least one signal detector disposed to receive two or more signal beams sequentially reflected from the scanning mirror.

7. The optical scanning system of claim 6, wherein the at least one signal detector is a plurality of signal detectors, each of which receives a respective plurality of signal beams sequentially reflected from the scanning mirror.

8. The optical scanning system of claim 6, further comprising:
two or more optical fibers to convey respective optical signals; and
two or more collimators to collimate light from respective ones of the two or more optical fibers to provide the two or more signal beams.

9. A method of controlling a resonant scanning mirror that oscillates about a rotation axis in response to a drive signal, comprising:
directing a reference light beam directed to the resonant scanning mirror;
a reference detector receiving the reference light beam reflected from the resonant scanning mirror twice during each oscillation of the resonant scanning mirror, the reference detector outputting two pulses during each oscillation of the scanning mirror, a time interval between the two pulses less than one-half of an oscillation period of the scanning mirror; and
setting both an amplitude and a frequency of the drive signal based on an output of the reference detector, wherein setting the frequency of the drive signal comprises:
performing a windowed integration of the drive signal over the oscillation period exclusive of the time interval between the peaks of the two pulses;
substracting a result of the windowed integration at an end of each integration period from a second predetermined value to provide a phase error;
integrating the phase error; and
synthesizing a square wave, wherein a frequency of the square wave is set by the integrated phase error.

10. The method of claim 9, wherein setting the amplitude of the drive signal comprises:
setting the amplitude of the drive signal such that a ratio of the time interval between the two pulses and the oscillation period is equal to a first predetermined value.

11. The method of claim 9, wherein setting the frequency of the drive signal comprises:
computing an integral of the drive signal over the oscillation period exclusive of the time interval between the two pulses; and
setting the frequency of the drive signal such that the integral is equal to a second predetermined value.

12. The method of claim 9, wherein setting the amplitude of the drive signal comprises:
determining temporal locations of the two pulses; and
determining the time interval between the two pulses and the oscillation period;
dividing the time interval between the two pulses by the oscillation period;
subtracting a result of the dividing from a first predetermined value to determine an amplitude error;
integrating the amplitude error; and
setting the amplitude of the mirror drive signal based on the integrated amplitude error.

13. The method of claim 12, further comprising:
multiplying the square wave by the integrated amplitude error to provide the drive signal.

14. The method of claim 9, further comprising:
at least one signal detector receiving two or more signal beams sequentially reflected from the scanning mirror.

15. The method of claim 14, wherein the at least one signal detector is a plurality of signal detectors, the method further comprising:
each of the plurality of signal detectors receiving a respective plurality of signal beams sequentially reflected from the scanning mirror.

16. The method of claim 14, further comprising:
receiving two or more optical signals via respective optical fibers; and
collimating light from the respective optical fibers to provide the two or more signal beams.

* * * * *